(12) United States Patent
Tse

(10) Patent No.: US 7,863,796 B2
(45) Date of Patent: Jan. 4, 2011

(54) HIGH PRECISION MOTOR AND ITS MACHINING AND ASSEMBLING METHOD

(76) Inventor: Yeungfei Tse, Room 389, Yue On Hse, Yue Wan Estate, Chi Wan, Hong Kong (CN)

( * ) Notice: Subject to any disclaimer, the term of this patent is extended or adjusted under 35 U.S.C. 154(b) by 337 days.

(21) Appl. No.: 12/094,777

(22) PCT Filed: Mar. 12, 2007

(86) PCT No.: PCT/CN2007/000777

§ 371 (c)(1),
(2), (4) Date: May 23, 2008

(87) PCT Pub. No.: WO2007/147309

PCT Pub. Date: Dec. 27, 2007

(65) Prior Publication Data

US 2008/0272665 A1 Nov. 6, 2008

(30) Foreign Application Priority Data

Jun. 14, 2006 (CN) .......................... 2006 1 0061199

(51) Int. Cl.
*H02K 15/02* (2006.01)

(52) U.S. Cl. .................. 310/216.111; 310/216.004; 29/596

(58) Field of Classification Search .......... 310/216.111, 310/156.01, 216.001, 216.004, 216.016, 310/216.017, 216–218; 29/596
See application file for complete search history.

(56) References Cited

U.S. PATENT DOCUMENTS

| 5,045,742 A * | 9/1991 | Armstrong et al. .... 310/216.069 |
| 2006/0138894 A1* | 6/2006 | Harada et al. ............... 310/217 |

* cited by examiner

*Primary Examiner*—Quyen Leung
*Assistant Examiner*—Leda Pham

(57) ABSTRACT

A motor includes a stator, a rotor, a shaft (50) and two end caps (10, 40), which are assembled together. According to the precision requirements, the outer circumference of the rotor core (20), and the outer circumference, the inner bore (33), the end surfaces of the stator core (30) are subjected to grind. The ground rotor core (20) is nested in the ground stator core inner bore (33), wherein the punched outer diameter of the rotor core (20) is equal to the punched diameter of the inner bore (33) of the stator core (30). The shaft (50) is pressed directly into the shaft bore of the rotor core (20) so as to tightly fit with the shaft bore of the rotor core (20).

14 Claims, 6 Drawing Sheets

HIGH PRECISION MOTOR AND ITS MACHINING AND ASSEMBLING METHOD

FIELD OF THE INVENTION

The present invention relates to a motor, more particularly to a high precision motor and its machining & assembling method.

BACKGROUND OF THE INVENTION

Over years, technique for manufacturing motor has been that: a specified number of stamp-forming steel sheets of stator core or rotor core are superposed together respectively to form a stator core or a rotor core according to design requirements, while the outer circumference and the inner bore of the stator core or the rotor core are not machined, thus the motor has bad accuracy and large tolerance, and when the motor is assembled, it is impossible to make a accurate adjustment upon its fit clearance, thus leading to a big fit error in coaxiality and cylindricity. Therefore more power loss and noise and other defects of the electrometer are different to remove. Even a motor with higher precision level is only lathed upon the outer circumference of its rotor core, and an improvement to the fit accuracy of the motor is limited.

In the conventional technique, generally four stamped ribs are provided at the relative position of the shaft with certain hardness, where a rotor core is assembled, or the shaft is embossed at the relative position where the rotor core is assembled, so as to enlarge the diameter of the shaft. For example, if the diameter of the shaft is 8 mm, the diameter of the position with stamped ribs or embossed patterns is 8.2 mm. In this way, when the shaft is inserted in the shaft bore of the rotor core, a tight fit may be achieved between the shaft and the shaft bore of the rotor core. However, a disadvantage of this processing technique is that when the motor has larger torsional force, it is easy to form a phenomenon that the rotor core rotates about the shaft while the shaft remains still, thus the durability of the motor are reduced.

Additionally, in the conventional technology, end caps of the motor are mostly fastened with on the stator core against end surfaces of the stator core, and the precision regarding the coaxiality of the bearing hole between the front-end and back-end caps is low, thus the running track of the rotor core is elliptical and the power is dissipated.

Therefore, although the conventional manufacturing technique enjoys easy machining and low cost, the products thereout can only meet general requirements and can be used only in general environments or locations.

SUMMARY OF THE INVENTION

The invention provides a solution to solve the technical defects existed in the above conventional technology, and proposes an improved high precision motor and its machining and assembly methods, so as to promote machining precision of the stator core and rotor core, and to promote power factor and durability of the motor.

A technical solution of the present invention that is adapted to solve the above technical problems is: a machining method for motor core is provided, comprising:

grinding an outer circumference, an inner bore and/or two end surfaces of the core that is assembled into one body according to different precision requirements.

Advantageously, said machining method for motor core further comprises: grinding the outer circumference of the rotor core that is riveted into one body.

Advantageously, said machining method for motor core further comprises: grinding the outer circumference, the inner bore and two end surfaces of the stator core that is riveted into one body.

Advantageously, said machining method for motor core further comprises:

prior to grinding the stator core, superposing two thick steel sheets of a same shape with a punched sheet of the stator core to two ends of the stator core respectively, and riveting them with the punched sheets of the stator core to form one body, wherein the thickness of the thick steel sheets is more than or equal to 0.3 mm.

Advantageously, parallelism of the two end surfaces of the stator core after being ground is less than or equal to 0.008 mm.

Advantageously, an air gap between the stator core and the rotor core after being ground is less than or equal to 0.175 mm.

In order to solve its technical problems, the present invention also provides a high precision motor, comprising a stator, a rotor, a shaft, a front-end cap and a back-end caps assembled together, the two caps being fixed with the stator, wherein a rotor core of the rotor has a ground outer circumference; a stator core of the stator has an outer circumference, an inner bore and two end surfaces which have been ground respectively; and the rotor core is fitted in the inner bore of the stator core, and a stamping diameter of the inner bore of the stator core before being ground is equal to a stamping outer diameter of the outer circumference of the rotor core before being ground.

Advantageously, the shaft is directly pressed into the shaft bore of the rotor core, achieving a tight fit having full contact with the shaft bore of the rotor core.

Advantageously, a diameter of the shaft is at most 0.015 mm less than an inner diameter of the shaft bore of the rotor core.

Advantageously, the end cap comprises a bearing seat and a stator support, wherein a hollow columned lower end of the stator support is covered on the outer circumference of the stator core; and a stepwise spigot is provided inside the hollow columned lower end, against the end surface of the stator core.

Advantageously, the stator core and the two end caps respectively covering the frond-end and back-end of the stator core are assembled together by screws.

Advantageously, a bearing is arranged in the bearing seat of the end cap, and two bearing covers are arranged respectively at the inner and outer sides of the bearing seat, fixed on the bearing seat by screws to clamp the bearing.

Advantageously, the rotor core comprises a plurality of round punched rotor sheets that are riveted into one body.

Advantageously, the stator core comprises a plurality of round punched stator sheets and two thick steel sheets of a same shape with the punched stator sheets superposed on the two ends of the stator core respectively, and all these sheets are riveted into one body, wherein thickness of the thick steel sheets is more than or equal to 0.3 mm, and parallelism of the two end surfaces of the stator core is less than or equal to 0.008 mm.

Advantageously, an air gap between the ground outer circumference of the rotor core and the ground inner bore of the stator core is less than or equal to 0.175 mm.

The present invention also provides an assembly method for the above motor, comprising:

directly pressing a shaft into a shaft bore of the rotor core, to achieve a tight fit having full contact between the shaft and the shaft bore of the rotor core;

assembling the rotor core into a inner bore of the stator core, wherein the outer circumference of the rotor core, and the outer circumference, the inner bore and two end surfaces of the stator core have been ground prior to assembly, and a stamping diameter of the inner bore of the stator core is equal to a stamping outer diameter of the rotor core;

covering the outer circumference of the stator core at two ends with the hollow columned lower ends of the two end caps respectively, wherein a stepwise spigot is provided inside the hollow columned lower end, against the end surface of the stator core, and then assembling the stator core and the front-end and back-end two caps together by screws.

Advantageously, the rotor core comprises a plurality of round punched rotor sheets that are riveted into one body.

Advantageously, the stator core comprises a plurality of round punched stator sheets and two thick steel sheets of a same shape with the punched stator sheets superposed on the two ends of the stator core respectively, and all these sheets are riveted into one body, wherein thickness of the thick steel sheets is more than or equal to 0.3 mm, and parallelism of the two end surfaces of the stator core is less than or equal to 0.008 mm.

Advantageously, an air gap between the ground outer circumference of the rotor core and the ground inner bore of the stator core is less than or equal to 0.175 mm.

Advantageously, a diameter of the shaft is at most 0.015 less than an inner diameter of the shaft bore of the rotor core.

The beneficial effects of the high precision motor and its machining & assembly methods according to the present invention are: The motor of the present invention has made improvement to the conventional processing technique. The present invention adopts grinding technology when machining the stator core and rotor core. The outer circumference, inner bore and/or end surfaces are respectively ground. Further, the structures of the stator core, rotor core and end caps are all improved. Therefore, the machining precision of the stator core, rotor core and end caps has been improved significantly. This ensures higher coaxiality and cylindricity when assembling the motor, lowers power loss, decreases operating noise and temperature rise, prolongs service life, and lowers operating cost. All technical parameters of the motor machined and assembled according to the present invention are obviously superior to that machined and manufactured according to conventional technologies. Such motor is capable of working in environments where the motor manufactured according to common technologies cannot work or cannot work for a long time, e.g. used in electric vehicle. Further, the present invention is particularly suited for the manufacture of precise motor.

BRIEF DESCRIPTION OF THE DRAWINGS

Further description to the present invention will be stated below combined with the attached figures and embodiments.

DETAILED DESCRIPTION OF THE PREFERRED EMBODIMENTS

The motor involved in the present invention includes electromagnetic motor and permanent magnet motor. Both stator core and rotor core of the electromagnetic motor are made up of steel sheets; either the stator core or the rotor core of the permanent magnet motor is permanent magnet, while the other one is made up of steel sheets. Introduction to the invention is made in the case of electromagnetic motor.

Figure 1:
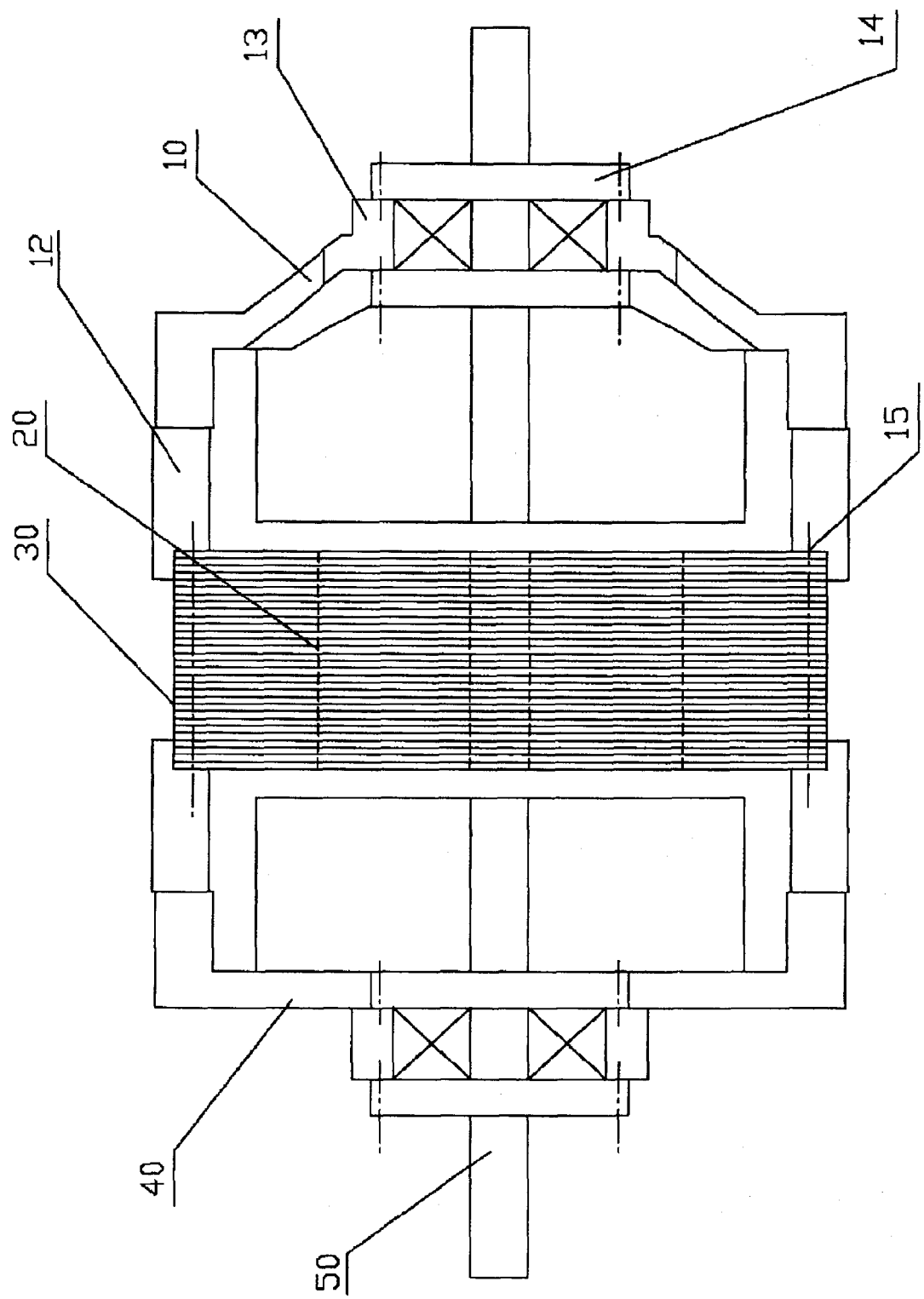
FIG. 1 is an assembly structural diagram of the motor in accordance with an embodiment of the invention.

Generally speaking, the motor is mainly comprised of a stator, a rotor, a shaft and end caps (in some motor such as series motor, said end cap is also known as supporting frame, so the end cap described below includes supporting frame), wherein the stator comprises a stator core and a stator winding, and the rotor comprises a rotor core and a rotor winding. Since the present invention merely concerns improvements to the hardware of the motor, the application does not provide detailed explanation for windings and other like parts. FIG. 1 is an assembly structural diagram of the motor in accordance with an embodiment of the invention. As shown in FIG. 1, the motor mainly comprises a shaft 50, a rotor core 20, a stator core 30 and a front-end cap 10 and a back-end cap 40 which are assembled together (windings are not shown).

Figure 2:
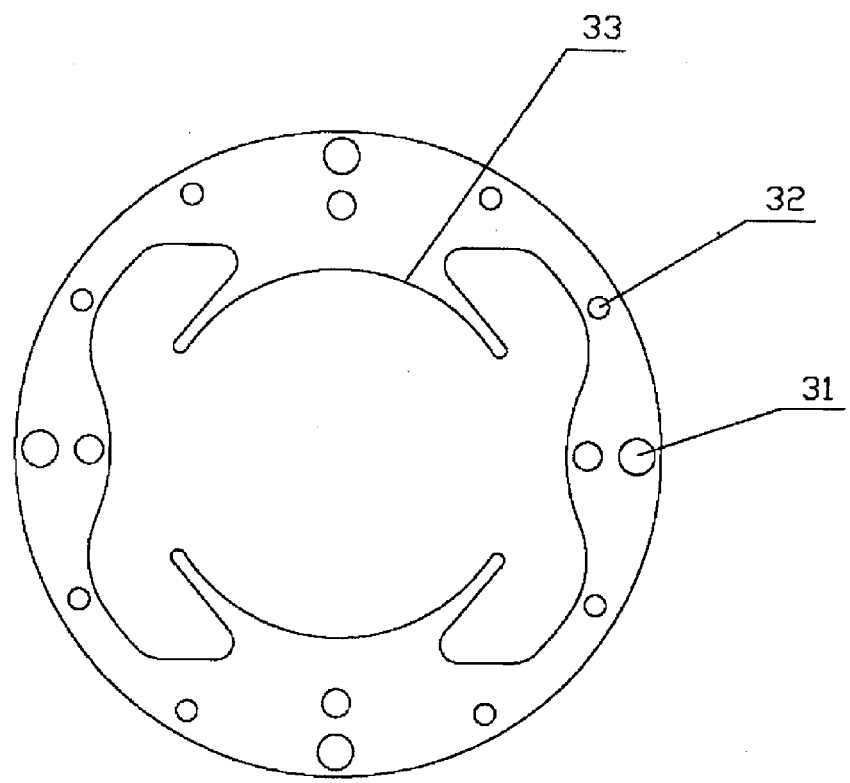
FIG. 2 is a front view of the stator core in accordance with an embodiment of the invention.
Figure 3:
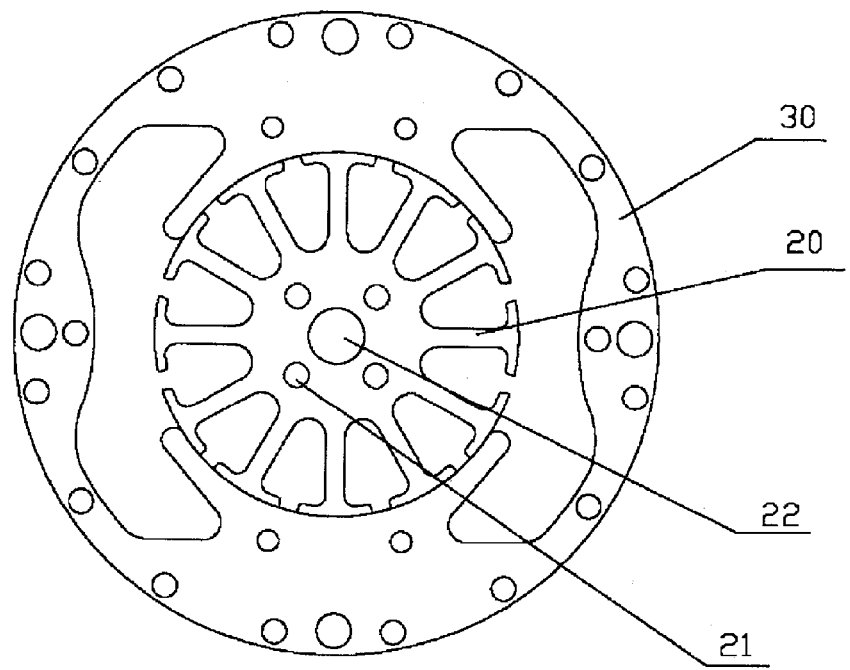
FIG. 3 is a front view of the stator core and the rotor core assembled together in accordance with an embodiment of the invention.
Figure 4:
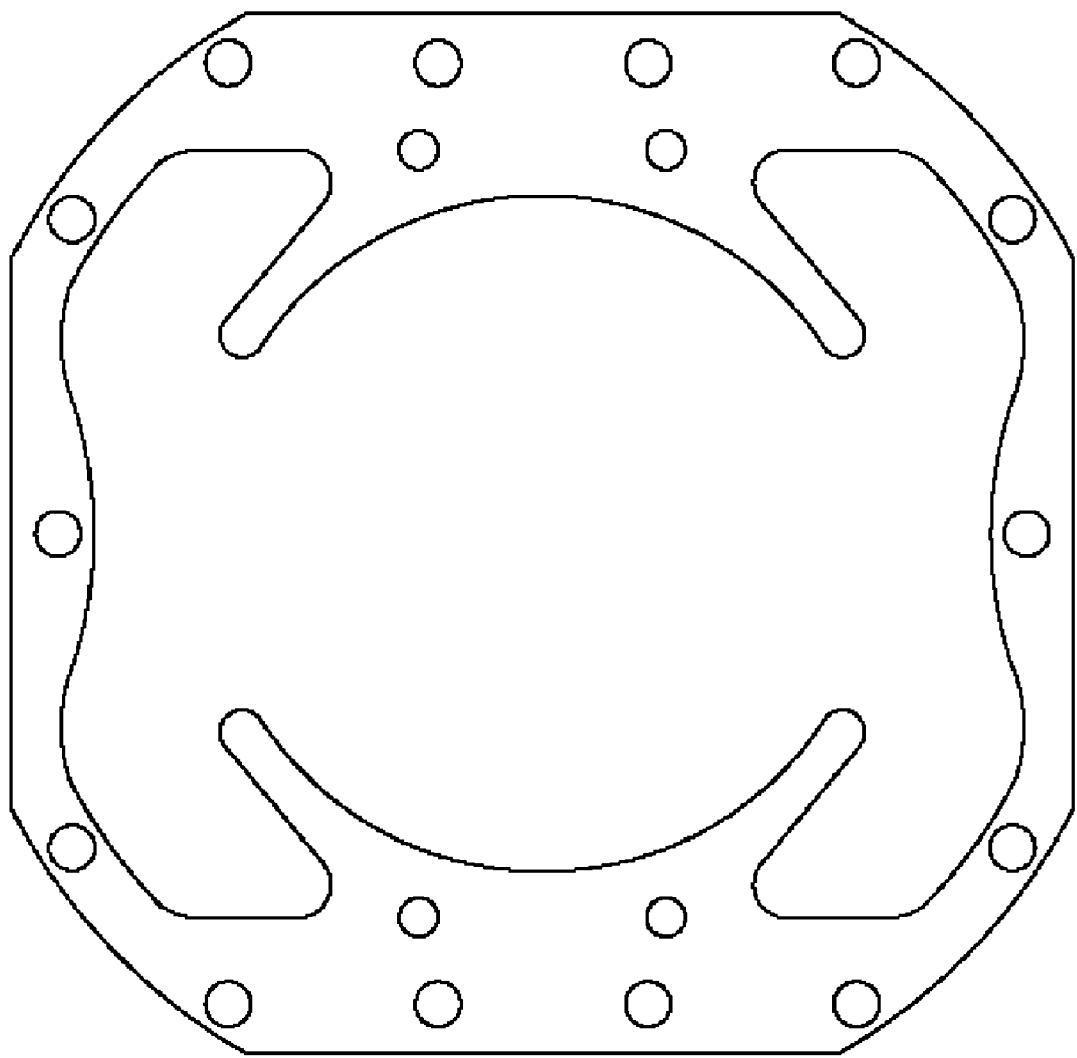
FIG. 4 is a front view of a conventional stator core.

Specific structure of the stator core 30 and rotor core 20 are shown in FIG. 2 and FIG. 3, respectively comprising a plurality of punched sheets superposed and riveted into one body. After the punched sheets are respectively riveted to form the stator core 30 or the rotor core 20, the end surfaces, outer circumference and/or inner bore are ground by precise grinders according to different requirements, to ensure high coaxiality and cylindricity of the stator core 30 or the rotor core 20. As shown in FIG. 2, the stator core 30 composed of a plurality of punched sheets is provided with a plurality of rivet hole 32, which are evenly distributed along the circumferential direction of the stator core 30. The plurality of punched sheets of the stator core 30 are riveted together with a number of rivets. The number and distribution of the rivets is adjusted depending on the outer diameter and thickness of the stator core 30. In this way, the punched sheets that constituting the stator core 30 are assembled tightly and relatively form one complete body. The center of the stator core 30 is provided with an inner bore 33, used to receiving the rotor core 20. Besides, at the same position of each punched sheet of the stator core, a number of screw holes 31 are distributed evenly. The screw holes 31 are used to fix the front-end cap 10 and the back-end cap 40. After a plurality of punched sheets are riveted into the stator core, the stator core riveted into one body may be machined by grinder mainly including the following steps: plane grinding the front-end and back-end surfaces of the stator core to ensure the parallelism of the front-end and back-end surfaces of the stator core not exceeding 0.008 mm; internal grinding the inner bore of the stator core to increase the cylindricity of the circumference of the inner bore and decrease the cylindricity deviation of the inner bore of the stator core; external grinding the outer circumference of the stator core to decrease the cylindricity deviation of the outer circumference of the stator core, and improve the coaxiality between the outer circumference and inner bore of the stator core and the perpendicularity between the cylinder formed by the outer circumference and the two end surfaces of the stator core. In order to facilitate precise grinding of the outer circumference and inner bore of the stator core through the conventional external grinder and internal grinder, in a embodiment of the present invention, the punched sheets of the stator have rounded shape, thus the stator core of the present invention has higher machining precision, compared with the shape of the traditional stator core as shown in FIG. 4. Due to the natural rule of machining, the periphery discontinuity of the punched sheets of the traditional stator core is bound to have bad effects on machining precision, which is lower than that with circular periphery.

Figure 6:
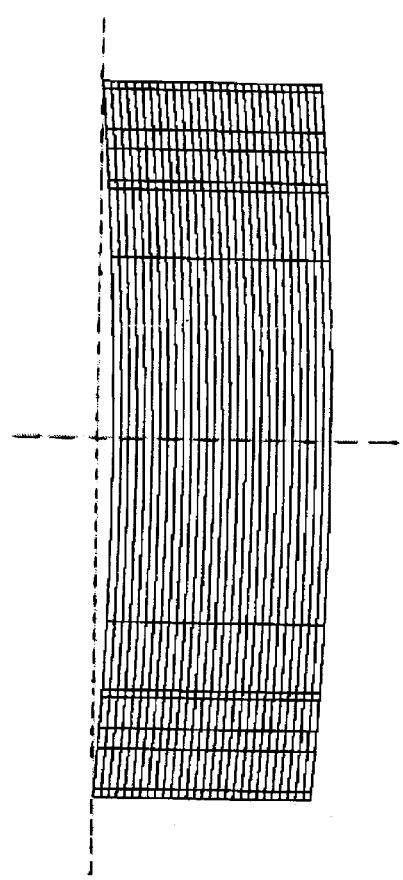
FIG. 6 is a side view of the stator core prior to being machined.
Figure 7:
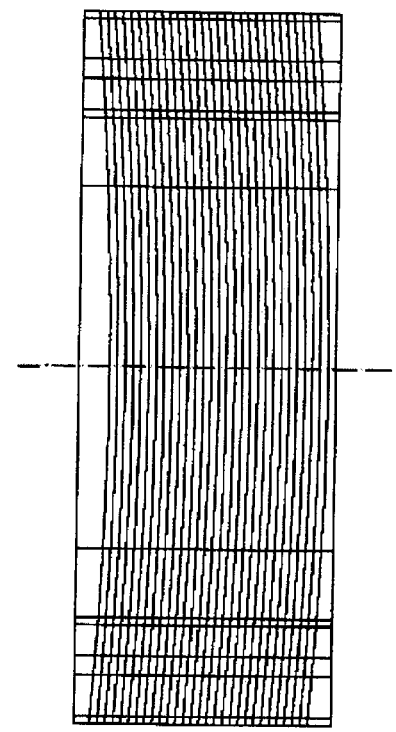
FIG. 7 is a side view of the stator core after being ground in accordance with an embodiment of the invention.
Figure 5:
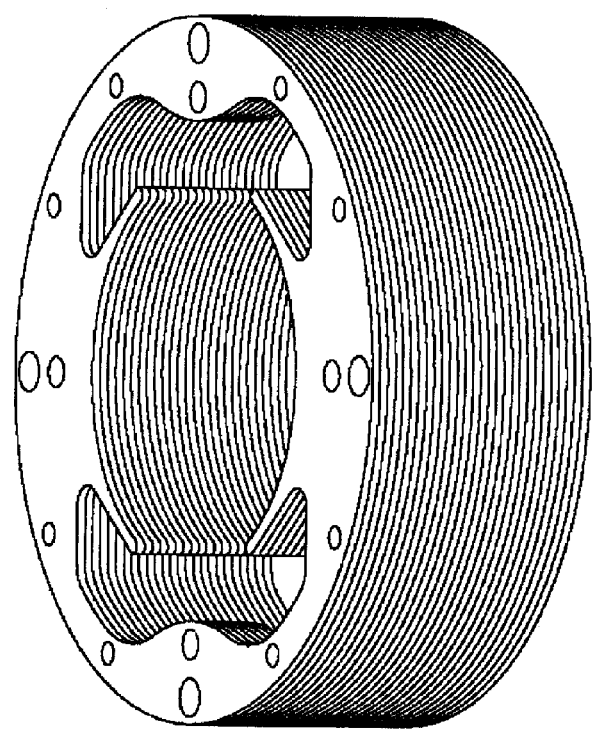
FIG. 5 is a perspective view of the stator core in accordance with an embodiment of the invention.

It is known in the prior art that the punched sheets that constituting the stator core are generally stamped from packaged steel strips with thickness of 0.3-3 mm. Although they are leveled off by a straightener, each punched sheets may still have certain radian rather than set completely in a plane. As shown in FIG. 5 and FIG. 6, after a plurality of punched sheets are riveted together according to a certain thickness, when the end surfaces of the stator core are ground to modify its flatness, the thickness of the punched sheets might be insufficient for grinding (more prominent when the thickness of the punched sheets is thin) because the planar deviation is large. Consequently, in an embodiment of the present invention, a thick steel sheet over 0.33 mm in thickness (the specific thickness is adjusted depending on the design of the punching mold, the thickness, outer diameter and flatness of the punched sheets) is superposed on the front-end and back-end surfaces of the stator core respectively, and riveted with the plurality of punched sheets to form a whole stator core. Then various kinds of machining as described before are applied to the stator core. Thus the thickness of the stator core is increased, facilitating grinding the end surfaces of the stator core, and the tightness of the riveted stator core is increased, also the stability after being machined.

Similarly, the rotor core of the present invention comprises a plurality of punched sheets superposed and riveted into one body. As shown in FIG. 3, the rotor core 20 is provided with a central shaft bore 22 and a number of rivet holes 21 distributed along the circumferential direction. The number and distribution of the rivet holes are adjusted depending on the outer diameter and thickness of the rotor core 20, to ensure the punched sheets that constituting the rotor core 20 are assembled tightly through rivets to form a complete rotor core. After a plurality of punched sheets are riveted into the rotor core, the outer circumference of the rotor core may be machined by an external grinder, so as to improve the dimension accuracy of the rotor core.

In the conventional processing technique, difference between the inner bore diameter of the stator core and the external diameter of the rotor core is generally 0.7-1 mm. If the tolerance between them is 0, the rotor core can not be assembled in the inner bore of the stator core; if the tolerance is less than 0.7 mm, scrap iron may be generated at stamping, which can easily damage moulds and bring inconvenience for mass production. The assembly of the improved stator core and rotor core of the present invention is shown in FIG. 3. The dimensions of the punched stator sheets and the punched rotor sheets of the present invention adopt 0 vs. 0 designs when stamping them (for example, if the inner bore diameter of the punched stator sheets is 52 mm, the outer diameter of the punched rotor sheets is also 52 mm). Then the inner bore of the stator core and the outer circumference of the rotor core are ground as described above, the air gap between the stator core and the rotor core is decreased to the smallest dimension, i.e., the air gap may be less than or equal to 0.175 mm, which can increase the torsional force and improve the power factor.

For example, if the stamping diameter is 52 mm, the inner bore diameter of the stator core after being ground is 52.2 mm, and the outer diameter of the rotor core after being ground is 51.85 mm.

The shaft of the motor in accordance with the present invention may utilize SUS420J2 stainless steel, whose rigidity can reach HRC45-50 after heat treatment. After finish machining, the head and tail dimension error of the whole shaft may not exceed 0.003 mm, and the jumpiness of the outer circumference may not exceed 0.008 mm. When assembling, the shaft is directly pressed into the shaft bore, to enable the outer circumference of the shaft completely contact with the surface of the shaft bore of the rotor core, thus a tight fit with full contact is achieved. In this way, the shaft can bear large torsional force. The case that the stator keeps still due to too large torsional force when the rotor is running may not occur, and the durability of the motor is enhanced. In general, when the tightness between the shaft and the shaft bore of the rotor core is less than or equal to 0.015 mm, i.e., when the diameter of the shaft is at most 0.015 mm less than the inner diameter of the shaft bore of the rotor core, said tight fit with full contact can be achieved.

Figure 8:
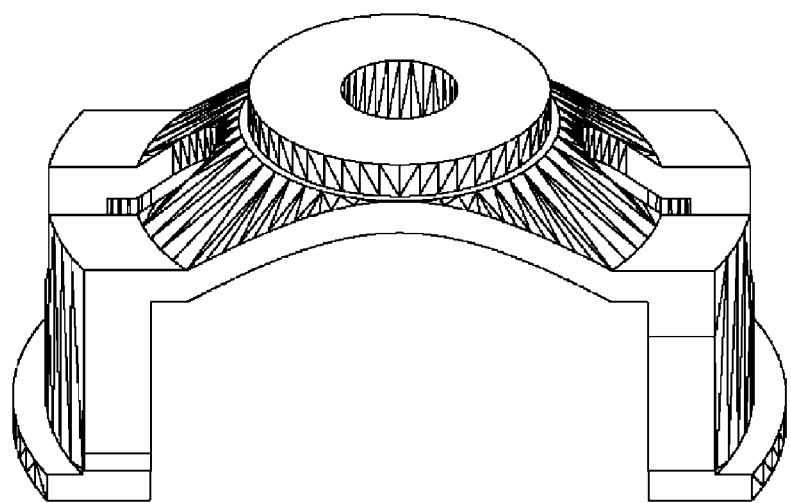
FIG. 8 is a perspective view of a conventional end cap.
Figure 9:
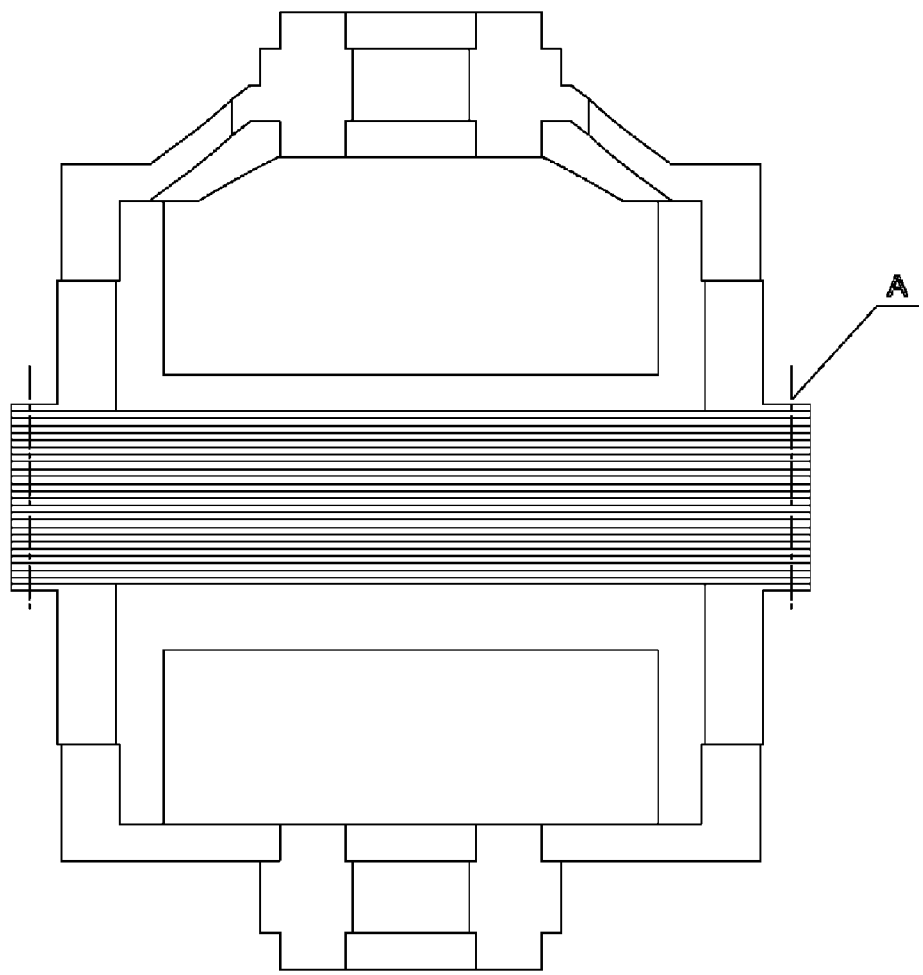
FIG. 9 is an assembly diagram of a conventional motor.
Figure 10:
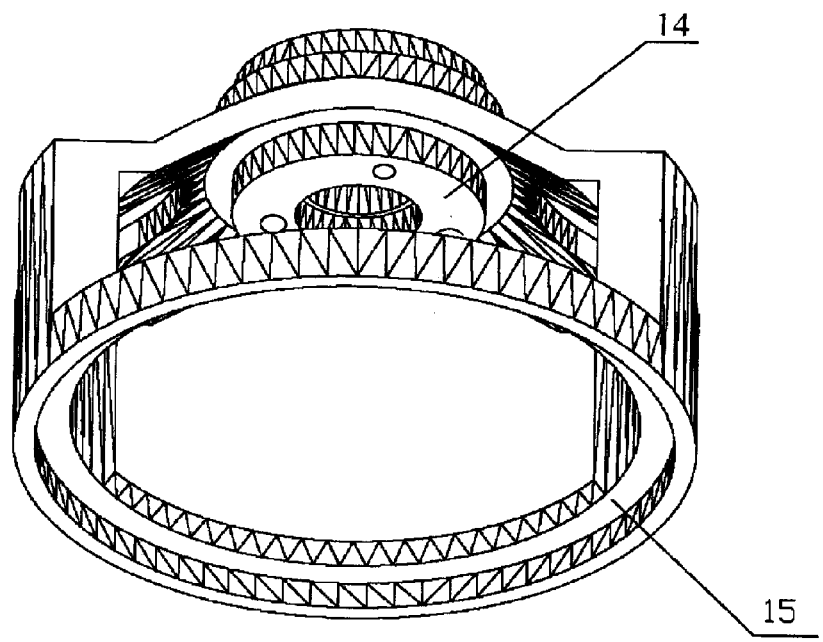
FIG. 10 is a perspective view of the end cap in accordance with an embodiment of the invention.
Figure 11:
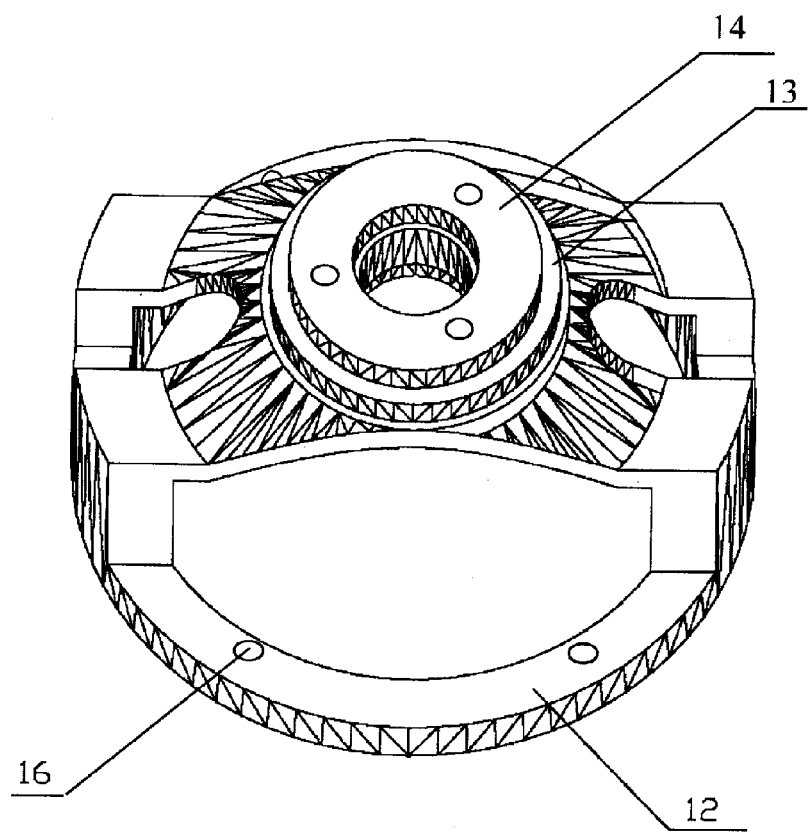
FIG. 11 is another perspective view of the end cap shown in FIG. 10.

FIG. 8 and FIG. 9 are respectively a perspective view of a conventional end cap and an assembly diagram of a conventional motor. The conventional end cap generally has only a left and a right partial circumferences at its lower end, which contact with the end surface of the stator core, and are fixed with the stator core through screws at positions A shown in FIG. 9. So this end cap has low stability and easy to be deformed, and it is difficult to ensure the coaxiality of the bearing holes of the front-end and back-end two caps. The invention has made improvement for the structures of the front-end and back-end caps. The perspective views of the front-end cap 10 are shown in FIG. 10 and FIG. 11. The front-end cap 10 comprises a bearing seat 13 and a stator support 12. The stator support 12 comprises a hollow columned lower end, and is provided with a stepwise spigot 15 at the inner side thereof. The thickness of this hollow columned lower end and the depth of the spigot can be adjusted depending on the outer diameter of the stator core and the dimension of the end cap and such factors. A number of screw holes 16 corresponding to that on the stator core are provided on the spigot 15 of the front-end cap 10. When assembling the motor, the front-end cap 10 is buckled on the outer circumference of the stator core 30 through the hollow columned lower end, and the inner stepwise spigot 15 rests against the end surface of the stator core 30 and is fixed by screws with the stator core 30 and the back-end cap through screw holes 16 on the spigot 15. The improved end caps of the present invention are positioned utilizing the ground outer circumference of the stator core as a reference point. The front-end and back-end caps are buckled on the outer circumference of the stator core to ensure a high coaxiality of the two caps and the stator core. In addition, the present invention also improves the positioning of the bearing in the end caps. As shown in the figures, the bearing and the shaft are arranged in the bearing seat 13 on the front-end cap 10, and two bearing covers 14 are arranged at the inner and outer sides of the bearing seat 13 respectively, fixed on the bearing seat 13 by screws to clamp the bearing between the two bearing covers 14. When the coaxiality of the shaft and the bearing is insufficient, it can be trimmed through adjusting the positions of the two bearing covers. The back-end cap 40 adopts a same structural design with the front-end cap 10, so further description to the back-end cap 40 is omitted.

Further explanation to the assembly of the improved motor of the present invention will be stated below combined with FIG. 1: Firstly, a plurality of punched rotor sheets are riveted to form a rotor core, and a plurality of punched stator sheets with thick steel sheets superposed at two ends thereof are riveted to form a stator core. Then, the outer circumference of the rotor core and the end surfaces, outer circumference and inner bore of the stator core are ground through precise grinders according to certain precision requirements. And then, the motor is assembled. The shaft 50 is directly pressed into the ground shaft bore of the rotor core 20, enabling the shaft 50 fully contact with the shaft bore of the rotor core 20 to achieve a tight fit; then, the rotor core 20 is assembled in the inner bore of the stator core 30. Since the diameter of the rotor core and the inner diameter of the inner bore of the stator core adopts 0 vs. 0 designs, the air gap between them after being ground is less than or equal to 0.175 mm; and then, the hollow columned lower ends of the front-end cap 10 and the back-end cap 40 are respectively buckled onto the outer circumferences at two ends of the stator core 30, and the stepwise spigots 15 rests against the end surfaces of the stator core; and then the stator core and the front-end and back-end two caps are fixed together by screws.

Detailed description to various improvements of the present invention is stated above in the case of electromagnetic motor. The said improvements are also applicable to the permanent magnet motors. For example, when the stator core is permanent magnet but the rotor core is comprised of steel sheets, after the magnet constituting the stator core is felted with the cap, external grinding and plane grinding according to the above-mentioned method are applied to the outer circumference and two end surfaces of the cap respectively, and the inner bore of the stator core is ground by a internal grinder. Machining to the rotor core is same to that of the electromagnetic motor. Further for example, when the stator core is comprised of steel sheets but the rotor core is permanent magnet, the corresponding parts of the stator core and rotor core can be ground to enhance precision according to the machining method of the electromagnetic motor. The above-described structure improvement and assembly method is also applicable to the permanent magnet motors.

The present invention can be executed through other different embodiments without departing from the main spirit and features of the present invention. Therefore, it is intended that the aforesaid embodiments are only illustrative examples used to explain the present invention, and shall not be deemed as limits to the invention. It will be understood by those skilled in the art that various changes and substitutions that may be made without departing from the scope of the present invention are all falling within the scope of the present invention.

I claim:

1. A high precision motor, comprising a stator, a rotor, a shaft, a front-end cap and a back-end caps assembled together, the two caps being fixed with the stator, characterized in that: a rotor core of the rotor has a ground outer circumference; a stator core of the stator has a outer circumference, a inner bore and two end surfaces which have been ground respectively; and the rotor core is fitted in the inner bore of the stator core, and a stamping diameter of the inner bore of the stator core before being ground is equal to a stamping outer diameter of the outer circumference of the rotor core before being ground.

2. The high precision motor as in claim 1, characterized in that: the shaft is directly pressed into the shaft bore of the rotor core, achieving a tight fit having full contact with the shaft bore of the rotor core.

3. The high precision motor as in claim 2, characterized in that: a diameter of the shaft is at most 0.015 mm less than an inner diameter of the shaft bore of the rotor core.

4. The high precision motor as in claim 1, characterized in that: the end cap comprises a bearing seat and a stator support, wherein a hollow columned lower end of the stator support is covered on the outer circumference of the stator core; and a stepwise spigot is provided inside the hollow columned lower end, against the end surface of the stator core.

5. The high precision motor as in claim 4, characterized in that: the stator core and the two end caps respectively covering the frond-end and back-end of the stator core are assembled together by screws.

6. The high precision motor as in claim 4, characterized in that: a bearing is arranged in the bearing seat of the end cap, and two bearing covers are arranged respectively at the inner and outer sides of the bearing seat, fixed on the bearing seat by screws to clamp the bearing.

7. The high precision motor as in claim 1, characterized in that: the rotor core comprises a plurality of round punched rotor sheets that are riveted into one body.

8. The high precision motor as in claim 1, characterized in that: the stator core comprises a plurality of round punched stator sheets and two thick steel sheets of a same shape with the punched stator sheets superposed on the two ends of the stator core respectively, and all these sheets are riveted into one body, wherein thickness of the thick steel sheets is more than or equal to 0.3 mm, and parallelism of the two end surfaces of the stator core is less than or equal to 0.008 mm.

9. The high precision motor as in claim 1, characterized in that: an air gap between the ground outer circumference of the rotor core and the ground inner bore of the stator core is less than or equal to 0.175 mm.

10. An assembly method for motor as in claim 1, characterized in that the method comprises:

directly pressing a shaft into a shaft bore of the rotor core, to achieve a tight fit having full contact between the shaft and the shaft bore of the rotor core;

assembling the rotor core into a inner bore of the stator core, wherein the outer circumference of the rotor core, and the outer circumference, the inner bore and two end surfaces of the stator core have been ground prior to assembly, and a stamping diameter of the inner bore of the stator core is equal to a stamping outer diameter of the rotor core;

covering the outer circumference of the stator core at two ends with the hollow columned lower ends of the two end caps respectively, wherein a stepwise spigot is provided inside the hollow columned lower end, against the end surface of the stator core, and then assembling the stator core and the front-end and back-end two caps together by screws.

11. The assembly method for motor as in claim 10, characterized in that: the rotor core comprises a plurality of round punched rotor sheets that are riveted into one body.

12. The assembly method for motor as in claim 10, characterized in that: the stator core comprises a plurality of round punched stator sheets and two thick steel sheets of a same shape with the punched stator sheets superposed on the two ends of the stator core respectively, and all these sheets are riveted into one body, wherein thickness of the thick steel sheets is more than or equal to 0.3 mm, and parallelism of the two end surfaces of the stator core is less than or equal to 0.008 mm.

13. The assembly method for motor as in claim 10, characterized in that: an air gap between the ground outer circumference of the rotor core and the ground inner bore of the stator core is less than or equal to 0.175 mm.

14. The assembly method for motor as in claim 9, characterized in that: a diameter of the shaft is at most 0.015 less than an inner diameter of the shaft bore of the rotor core.

* * * * *